United States Patent [19]
Anderson et al.

[11] Patent Number: 6,108,321
[45] Date of Patent: Aug. 22, 2000

[54] INTERFERENCE BASED DYNAMIC CHANNEL ASSIGNMENT

[75] Inventors: Nefatiti Anderson, Plainfield; Simon C. Borst, Berkeley Heights, both of N.J.; Lynell E. Cannell, Naperville, Ill.; Terry Si-Fong Cheng, Randolph, N.J.; Lindsey Chew, Lafayette, N.J.; Sudheer A. Grandhi, Parsippany, N.J.; Chih-Lin I, Manalapan, N.J.; Joseph Samuel Kaufman, Holmdel, N.J.; Boris Dmitrievich Lubachevsky, Bridgewater, N.J.; Balakrishnan Narendran, New Providence, N.J.; Donna M. Sand, Lombard, Ill.

[73] Assignee: Lucent Technologies Inc., Murray Hill, N.J.

[21] Appl. No.: 08/811,986

[22] Filed: Mar. 5, 1997

Related U.S. Application Data

[60] Provisional application No. 60/020,670, Jun. 28, 1996.

[51] Int. Cl.[7] .................................................... H04Q 7/00
[52] U.S. Cl. ......................... 370/329; 370/341; 370/444; 455/452
[58] Field of Search ...................................... 370/328, 329, 370/330, 334, 341, 431, 437, 444, 332, 335, 336, 337; 455/422, 447, 450, 452

[56] References Cited

U.S. PATENT DOCUMENTS

| | | | |
|---|---|---|---|
| 5,263,176 | 11/1993 | Kojima et al. | 455/512 |
| 5,363,428 | 11/1994 | Nagashima | 455/452 |
| 5,475,864 | 12/1995 | Hamabe | 455/452 |
| 5,737,691 | 4/1998 | Wang et al. | 455/63 |
| 5,771,454 | 6/1998 | Ohsawa | 455/452 |

*Primary Examiner*—Chau Nguyen
*Assistant Examiner*—Soon-Dong Hyun

[57] ABSTRACT

An interference based dynamic channel assignment scheme for a wireless communication network, for self configuring dynamic channel assignment of a plurality of channels, comprises the steps of: prioritizing a channel list and prioritizing a selected subset of the prioritized channel list. In further enhancements of the present invention, prioritizing a channel list is distributed on a per cell/sector basis so that prioritization is independent of frequency usage information from other cells/sectors and prioritization is based upon uplink and downlink characteristics.

42 Claims, 2 Drawing Sheets

CELL/SECTOR CHANNEL LISTS

LONG-TERM LIST

| CH. # | UPLINK MEASUREMENT | DOWN LINK MEASUREMENT | PRIORITY PARAMETER |
|---|---|---|---|
| | | | |
| | | | |
| | | | |
| | | | |
| | | | |
| | | | |
| | | | |
| | | | |
| | | | |

SHORT-TERM LIST

| CH. # | UPLINK MEASUREMENT | DOWN LINK MEASUREMENT | PRIORITY PARAMETER |
|---|---|---|---|
| | | | |
| | | | |
| | | | |
| | | | |
| | | | |

LONG-TERM PROCESS

SHORT-TERM PROCESS

INTERFERENCE BASED DYNAMIC CHANNEL ASSIGNMENT

CROSS REFERENCES TO RELATED APPLICATIONS

This application claims the benefit of U.S. Provisional Application Serial No. 60/020,670, filed on Jun. 28, 1996.

FIELD OF THE INVENTION

This invention relates generally to wireless communications, and more particularly to dynamic channel assignment.

BACKGROUND OF THE INVENTION

Wireless access provides tetherless access to mobile users, this has been done principally to address the requirements of two specific and disjoint domains: voice telephony and indoor data LANs. Cellular telephone networks have extended the domain of telephone service over a wireless last hop, while mobile-IP LANs such as WaveLAN from AT&T, and RangeLAN from Proxim, do the same for indoor users of TCP/IP data networks. Advances with wireless technology and high-speed integrated service wired networking promises to provide mobile users with comprehensive multimedia information access in the near future.

Personal Communication Services (PCS) are a broad range of individualized telecommunication services which enable individuals or devices to communicate irrespective of where they are at anytime. Personal Communication Networks (PCN) are a new type of wireless telephone system communicating via low-power antennas. PCNs offer a digital wireless alternative to the traditional wired line.

As a cellular mobile radio moves from one cell to another, it is "handed" off to the next cell by a controller, which determines which cell is receiving the strongest signal. Because the cellular user remains closer to the base transceiver than in classical mobile communications, the cellular user's transceiver requires less power and is therefore less expensive. The great advantage of the cellular concept over non-cellular radio is that higher capacity is allowed with the same frequency allocation. This advantage comes at a cost, the necessity of a large number of cell sites and associated radio ports. The switching from one cell to an adjacent cell site requires the accurate knowledge of the availability of the radio ports and their locations.

Cellular and PCS technologies that are based on Time Division Multiple Access (TDMA) and Frequency Division Multiple Access (FDMA) require some form of channel assignment scheme to divide spectrum amongst users. In the earlier systems channel assignment was based on a fixed channel reuse plan. This Fixed Channel Assignment (FCA) is known to serve uniform and heavy traffic satisfactorily. However when the traffic pattern is non-uniform a channel assignment scheme that assigns channels dynamically has the potential to serve users more efficiently. FCA, while being straight forward to implement, requires elaborate cell-site engineering and manual processes to install the system. Due to these reasons spectrum management in cellular systems have started to migrate toward dynamic channel assignment schemes.

It is advantageous to automate the allocation of a channel within a cell to optimize performance in order to improve the overall quality of the operation of the cell site. While some causes of channel interference can be long term in duration such as terrain features, system deployment (which includes base station layout, antenna types and configurations, etc.) and fixed spectrum, other types of channel interference are short term in duration such as traffic patterns, interference and shadow fading.

Therefore, there is a need for dynamic channel assignments for wireless networks, full automation, easy system growth and higher capacity.

SUMMARY OF THE INVENTION

In accordance with the present invention, there is provided in an interference based dynamic channel assignment scheme for a wireless communication network for dynamic channel assignment of a plurality of channels, comprises the steps of: prioritizing a channel list and prioritizing a selected subset of the prioritized channel list. In further enhancements of the present invention, prioritizing a channel list is distributed on a per cell/sector basis so that prioritization is independent of frequency usage information from other cells/sectors and prioritization is based upon uplink and downlink characteristics.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use with mobile telephone cellular systems and shall be described with respect to this application, the methods and apparatus disclosed here can be applied to other cellular systems including PCS and indoor wireless systems.

Figure 1:
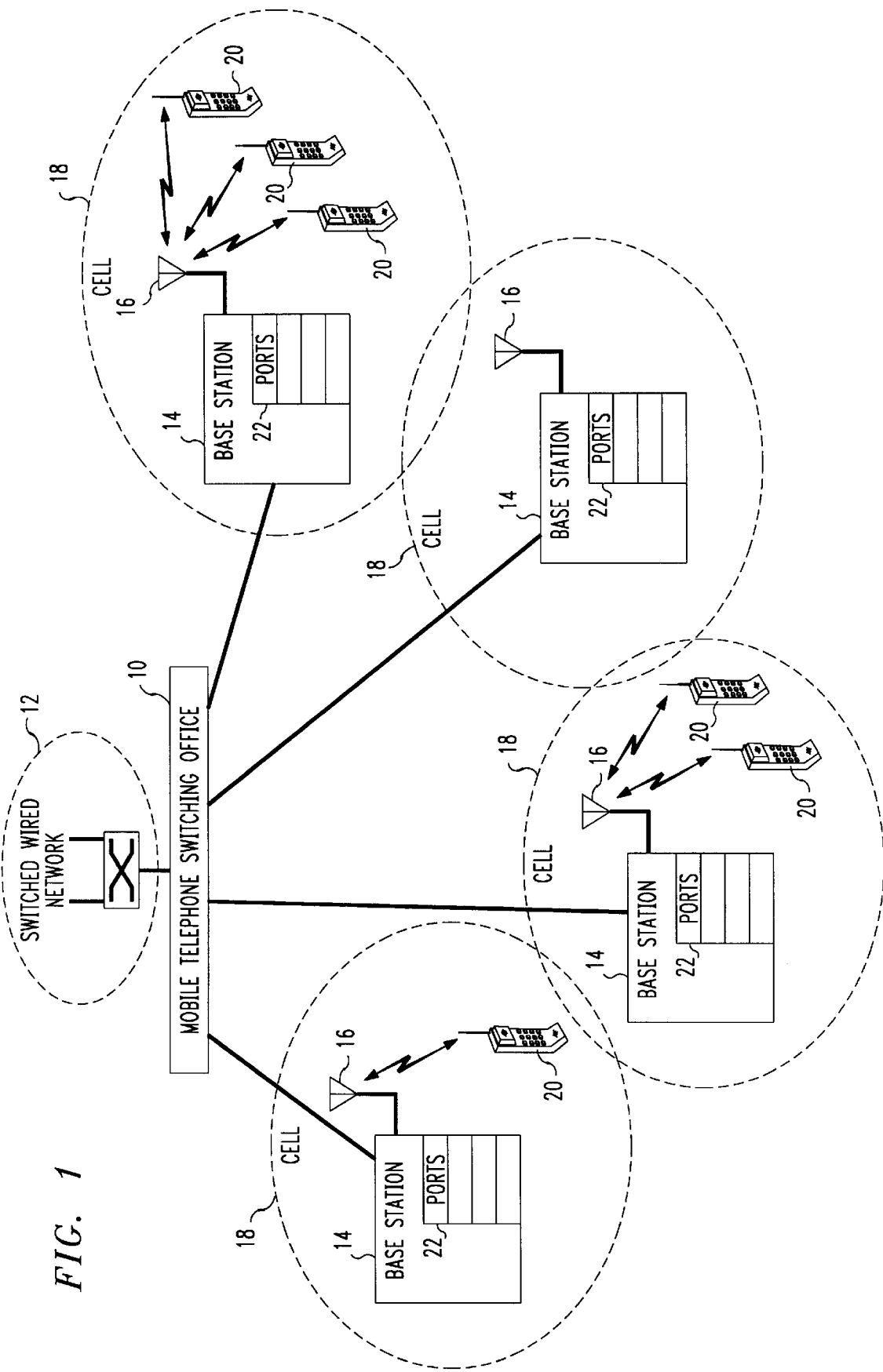
FIG. 1 is a block diagram of a wireless network employing the present invention.

Referring now to FIG. 1 there is shown a block diagram of a wireless network. A Mobile Telephone Switching Office (MTSO) 10, also know as a Mobile Switching Center (MSC), provides for switching calls between the cellular network and the switched wired network 12. The MTSO 10 controls the entire operation of a cellular system, setting up and monitoring all cellular calls, and tracking the location of all cellular-equipped vehicles traveling in the system, arranging hand-offs, and providing billing information. The MTSO 10 is connected to a plurality of base stations 14. The base station 14 is the fixed transceiver in the wireless network, which is coupled through a radio port to a cellular antenna 16. The typical base station 14 consists of multiple radio transceiver ports 22. Radio transceiver ports 22 are assigned to a channel. The geographical area for which a base station 14 acts as the gateway is called its cell 18, the various base station 14 nodes are distributed at suitable locations. A mobile unit 20 communicates with a base station 14 within a cell 18 through an assigned channel pair consisting of an unlink frequency and a downlink frequency.

The present invention is an interference based dynamic channel allocation scheme that provides full automation, easy system growth, and potentially higher capacity when compared to FCA. In this scheme besides including adaptation to traffic, radio link, interference, and shadow fading variations there is also incorporated adaptation to terrain features, fixed spectrum, system deployment and system growth. The present invention handles two time scales of interference adaptation, which are slow-long-term variations (arising from terrain features, system deployment, fixed spectrum, etc.) and fast-short-term variations (arising from traffic patterns, radio link, interference, shadow fading, etc.) Further, the present invention is totally distributed on a per cell/sector basis.

Figure 2:
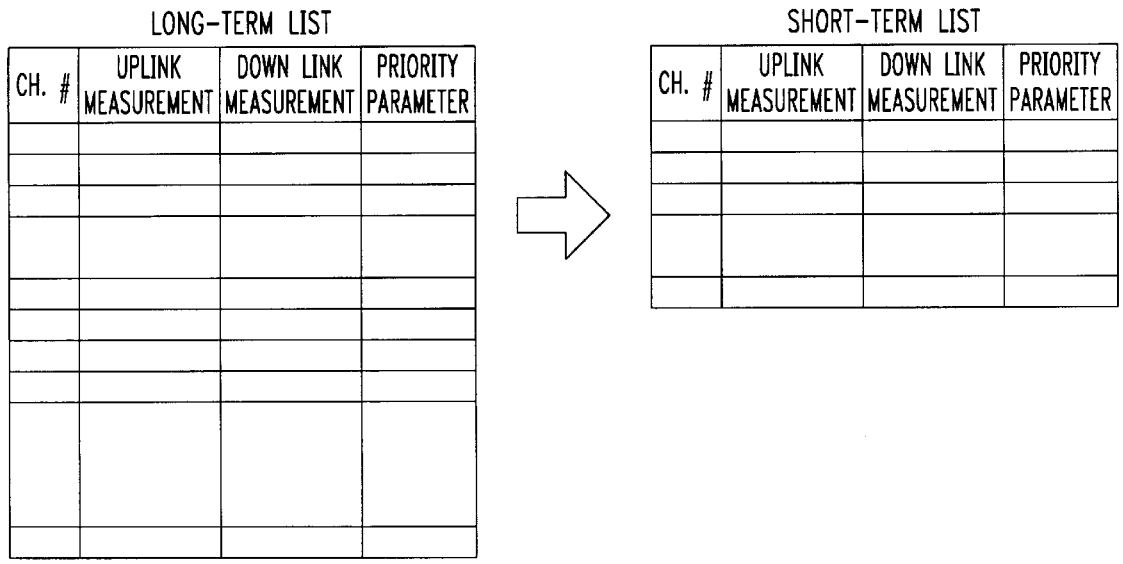
FIG. 2 is a diagrammatic representation of the cell/sector channel list.

Referring now to FIG. 2, there is shown a diagrammatic representation of the cell/sector channel lists. A dynamic channel assignment scheme utilizes interference measurements made on the uplink and downlink. The scheme essentially has two concurrent processes, namely long-term and short-term, which order the channels for each cell 18 (or sector) based on interference measurements made in the cell 18 (or sector). This interference based dynamic channel assignment is distributed in the sense that each cell 18 (or sector) has a long-term and short-term process. The long-term process orders the entire spectrum for each cell based on a moving average of interference measurements forming a long term list for both the uplink channel assignments and the downlink channel assignments. Since a moving average value is used by the long-term process it adapts to slow (or long-term) variations in system characteristics such as terrain features, system deployment, system growth, and fixed spectrum. The short-term process orders only a certain number of channels that are the best as deemed by the long-term process which form the short term list. The short-term process uses instantaneous interference measurements to order channels and hence adapts to fast (or short-term) variations in the system such as traffic pattern, radio link, interference and shadow fading. The two processes together groom channels for each cell (or sector) and support a robust dynamic channel assignment procedure.

System and Model Notation

TDMA and FDMA systems are also referred to as digital and analog systems respectively. The Carrier to Interference Ratio (CIR) at the receiver for the $i^{th}$ channel pair on the uplink and downlink is denoted by $\gamma_U^{(i)}$ and $\gamma_D^{(i)}$ respectively. Let the minimum acceptable values for CIRs on the uplink and downlink be denoted by $\Gamma_U$ and $\Gamma_D$ respectively. The values of $\Gamma_U$ and $\Gamma_D$ are determined by the types of receivers in the system and typically take values in the range 11–25 dB. The received signal strength (RSS) on the $i^{th}$ channel pair on the uplink and downlink are denoted by $RSS_U^{(i)}$ and $RSS_D^{(i)}$ respectively and the corresponding moving average RSS (MARSS) values are denoted by $MARSS_U^{(i)}$ and $MARSS_D^{(i)}$ respectively. Interference thresholds on the uplink and downlink are denoted by $I_U$ and $I_D$ respectively. The values of $I_U$ and $I_D$ are given by $$I_U = G_A P_U G_B / \Gamma_U \quad \text{Equation 1.}$$

and $$I_D = G_A P_D G_B / \Gamma_D \quad \text{Equation 2.}$$

where $G_A$ is a constant that includes antenna gains, $G_B$ is the worst case link gain between the center and boundary of the cell, and $P_U$ and $P_D$ are the transmitted powers on the uplink and downlink respectively.

The bit error rate (BER) on the $i^{th}$ channel pair on the uplink and downlink are denoted by $BER_U^{(i)}$ and $BER_D^{(i)}$ respectively. The maximum acceptable BERs on the uplink and downlink are denoted by $BER_U$ and $BER_D$ respectively and are typically set at $10^{-3}$ for voice traffic.

Interference Based Dynamic Channel Assignment

The Interference Based Dynamic Channel Assignment (IBDCA) scheme consists of signal measurement, channel ordering, call admission, channel assignment, call maintenance, call handoff and system/cell startup procedures. The IBDCA scheme makes signal measurements in each cell 18 (or sector) on the uplink and the downlink (downlink measurement capability exists only in digital systems). Based on the measurements on the uplink and downlink the channels are ordered by a long-term and a short-term process, in each cell 18 (or sector). When a call arrives in a cell 18 certain admission and blocking criteria are applied to determine if the call may be admitted. If the call is admitted a channel is assigned to the call based on certain channel assignment criteria. Once the call is set up on the assigned channel the call is monitored and may be handed over to another channel if necessary to maintain the quality of communication.

Signal Measurement and Estimates

Two types of estimates are made from signal measurements: (1) received signal strength (RSS) and (2) carrier to interference ratio (CIR). RSS estimates are used in channel ordering procedures. CIR estimates are used in call admission, handoff and channel assignment procedures.

RSS estimates are made only on channels that are not currently active in the cell 18 (or sector). A pair of frequencies are assigned to a call: one to provide the uplink (mobile unit 20 to base station 14) and the other to provide the downlink (base station 14 to mobile unit 20). This pairing of frequencies is pre-defined; the pair is called a channel. So it is desirable to obtain measurements and make channel assignment decisions not only on the uplink but also on the downlink. In current systems the time slots are not synchronized amongst cells and the TDMA carrier on the downlink is off only when all time slots are idle.

When the RSS measurement process is on a frequency basis the measurement and ordering in the IBDCA scheme may be on a frequency basis. In this case the RSS measurement period must span a full cycle of time slots on the carrier. If the RSS measurement process is on a time slot basis then the measurement, ordering, and channel assignment in the IBDCA scheme may be on a time slot basis. Thus there may be four combinations: (1) the long-term process being frequency based and the short-term process being frequency based; (2) the long-term process being frequency based and the short-term being time slot based; (3) the long-term process being time slot based and the short-term process being frequency based; (4) the long-term process being time slot based and the short-termprocess being time slot based. One of these four conbinations may be chosen in the IBDCA algorithm to suit the particular system under consideration.

A radio unit that resides at the base station 14 is capable of making RSSI measurements on the uplink in both digital and analog modes. As mentioned before, if the RSS measurement process is on a frequency basis then the measurement period for each RSS estimate on the uplink must span a full cycle of time slots on the frequency, although it can be longer if necessary. In order to compute each RSS estimate a number of RSSI samples are to be taken uniformly over this measurement period. The RSS estimate is then computed as a function of those RSSI samples. The advantage of the above scheme for signal strength measurement is that it is totally distributed, that is there is no need for any central coordination to check frequency usage to identify and discard measurements that fall on idle times slots of active frequencies. However this comes with the cost of extra processing and delay in the signal measurement because of the measurement period of length equal to at least a full cycle of time slots on the carrier.

In the downlink the carrier is turned off only when all time slots on the carrier are idle. Due to this fact RSSI samples falling in idle time slots of the frequency will also reflect the interference from the frequency. So the measurement period for RSS estimate on the down link does not have to span a full cycle of time slots on the frequency. Mobile units 20 in the digital mode are capable of making RSSI measurements (on a set of channels specified by the base) both during active and non-active modes. During an active mode (i.e. with an on-going call) the mobile unit 20 can make RSSI measurements as part of a procedure called Mobile Assisted Hand-Off (MAHO). When the mobile is in a non-active mode (i.e. with no active call) it can make RSSI measurements in a procedure called Mobile Assisted Channel Assignment (MACA). Also special radio units at the base station 14 may be used to make RSSI measurements on the downlink frequencies.

An estimate of expected CIR on the uplink before call initiation can be made by dividing the RSS estimate measured at the base on the Reverse Control CHannel (RCCH) with the instantaneous uplink RSS value of the channel under consideration.

The CIR on the downlink can be estimated before call initiation by dividing the RSS estimate measured at the base on the RCCH (with appropriate adjustment factors for the radio link since it is an approximation of the downlink signal strength) with the RSSI value measured on the channel under consideration at the mobile unit 20 and reported to the base station 14 as a MACA report.

Channel Ordering

The channel ordering in each cell is done by two processes; a long-term process and a short-term process. The long-term process, shown in FIG. 3, adapts to the slow (long-term) variations in the system such as terrain features, system deployment, system growth, and fixed spectrum. On the other hand the short-term process, shown in FIG. 4, adapts to fast (short-term) variations in the system such as traffic, radio link, interference and shadow fading. As described earlier the RSS measurements for both the long-term and short-term processes in a cell 18 are made on channels that are not active at that time in the cell 18.

Figure 3:
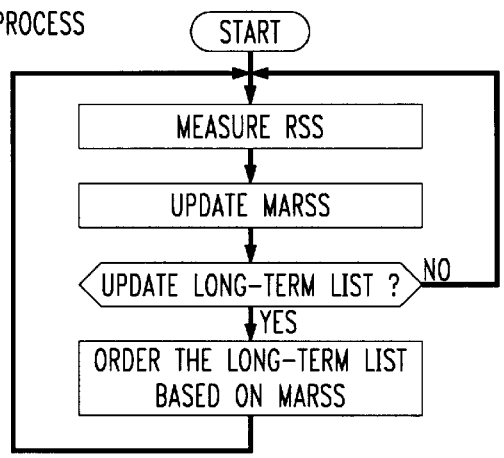
FIG. 3 is a flow chart of the long term channel assignment.

The long-term process, shown in FIG. 3, orders for the cell under consideration the entire spectrum based on a moving average RSS value. The channels are arranged in the order of increasing moving average RSS value. It may be necessary to maintain separate moving averages for different times corresponding to various levels of traffic intensities. For example traffic during nights is different from traffic during days and separate moving averages may be needed for nights and days. A moving average may need to be maintained for each hour, or it may be sufficient to maintain one moving average value that is updated only during busy hours and use this value always to order channels. Let k be the index of the time instants at which RSS measurements are made i.e. $RSS_U^{(i)}(k)$ and $RSS_D^{(i)}(k)$ are the RSS measurements made at the $k^{th}$ time instant on the $i^{th}$ channel for the uplink and downlink respectively. Let $W_U(.)$ and $W_D(.)$ denote weights for the uplink and downlink respectively and whose values are functions of $RSS_U^{(i)}(k)$ and $RSS_D^{(i)}(k)$ respectively. The weights are interference-penalty functions of the RSS values, i.e. the weights are to be adjusted so that moving averages decrease at a required rate when the interference (RSS) is low and increase at a required rate when the interference (RSS) is high. The expressions for moving averages for the uplink and downlink are $$MARSS_U^{(i)}(k) = \min\left\{MAXMA_U, \frac{1}{K}\sum_{l=0}^{K-1} W_U\left(RSS_U^{(i)}(k-l)\right)\right\} \quad \text{Equation 3.}$$

and $$MARSS_D^{(i)}(k) = \min\left\{MAXMA_D, \frac{1}{K}\sum_{l=0}^{K-1} W_D\left(RSS_D^{(i)}(k-l)\right)\right\} \quad \text{Equation 4.}$$

respectively, where, K denoted the length of the moving average window, and $MAXMA_U$ and $MAXMA_D$ are the maximum values the moving averages can take on the uplink and downlink respectively.

Figure 4:
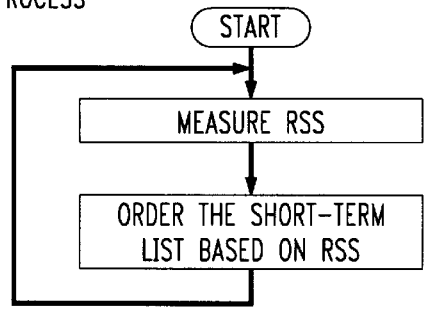
FIG. 4 is a flow chart of the short term channel assignment.

The short-term process, shown in FIG. 4, orders only a certain number, $n_S$, of the top most or best channels for that cell as deemed by the ordering of the long-term process, shown in FIG. 3. Note that the channels in the short-term list (for uplink and downlink) of length $n_S$ should satisfy $MARSS_U^{(i)} \leq I_U$ for the uplink and $MARSS_D^{(i)} \leq I_D$ for the downlink $\forall i=1, n_S$, if the channels are to be usable all the way to the boundary of the cell 18. It may be desirable to enforce this condition in the case of cellular or PCS with high mobility. In fixed cellular or PCS where the mobility is low this condition may not be desirable in the interest of achieving high capacity. The long-term process thus reduces the burden on the short-term process in measuring channels. In the short-term process channels are arranged in the order of increasing RSS estimates. The short-term process thus provides the cell with the best channels (i.e. the ordered short term list) for the channel assignment procedure.

The same locate receivers (receivers measuring RSS) can serve both short-term and long-term processes. The first priority in measurements is given to the short-term process. However it should be noted that the RSS measurement made for the short-term process can also be used by the long-term process in the moving average for the channel under consideration. The remaining capacity of the locate receivers after serving the short-term process can be used to make measurements for the long-term process.

Referring back to FIG. 2 each cell/sector has the entire spectrum (long term lists for uplink and downlink) ordered by the long-term process and the short-term list ordered by the Short-term process.

When used, the Auto-Tune Combiners (ATC) at cell sites take several seconds in tuning to new channels it may be desirable to continually tune the radios and ATCs to the current best channel(s) according to the short-term ordering. In the interest of not having the ATCs switching channels too often a hysteresis factor may be introduced (i.e. the difference in the instantaneous RSS values of the best and next-best channels should be above a hysteresis threshold before a switch is made).

Call Admission and Blocking

A call is blocked in a cell 18 if all radio ports 22 at the cell site are busy. If the call is not blocked (i.e. a radio port 22 is available to serve the call) then the call is admitted based on the following criterion. Let the number of channels in the short-term list be denoted by $n_S$.

A TDMA call is admitted if there exists a channel i such that $\gamma_U^{(i)} \geq \Gamma_U + \Delta\Gamma_U$ and $\gamma_D^{(i)} \geq \Gamma_D + \Delta\Gamma_D$, $1 \leq i \leq n_S$.  Equation 5 where $\Delta\Gamma_U$ and $\Delta\Gamma_D$ are extra margins that are introduced to control system performance. Increasing these margins will increase blocking and decrease dropping. So the margins give the operator "soft" control on blocking and dropping in the system.

An analog call is admitted if there exists a channel i such that $\gamma_U^{(i)} \geq \Gamma_U + \Delta\Gamma_U$, $1 \leq i \leq n_S$.  Equation 6.

Channel Assignment

Let the number of the channels in the short term list that allow the call to be admitted based on the admission criterion be denoted by $n_S^o$. If the call is admitted the best channel to be assigned to the call is determined according to the following criterion. For a TDMA call: assign an idle slot if available on an active frequency otherwise assign a slot on the $k^{th}$ channel such that $$\min\{\gamma_U^{(k)}, \gamma_D^{(k)}\} = \max\left\{\min\{\gamma_U^{(i)}, \gamma_D^{(i)}\}\right\}_{i=1}^{n_S^o}.$$

For an analog call: assign the $k^{th}$ channel if $$\gamma_U^{(k)} = \max\{\gamma_U^{(i)}\}_{i=1}^{n_S^o}.$$

Before call setup on the chosen channel a final instantaneous RSS measurement is made on the chosen channel and the admission criterion of the previous section is applied. Also at the same time a check is made at the MTSO (or with CS to CS messaging) to avoid channel assignment collisions (i.e. simultaneous channel assignments at first-tier cell sites). If the chosen channel does not satisfy the admission criterion or collides with another assignment then the process is repeated for several of the next best channels in the short-term list.

Call Maintenance

The existing handoff procedures based on call quality applies. However, handoff operating with IBDCA scheme could use C/I measurements if available in addition to of BER and hence can potentially offer better performance.

System and Cell Startup

When the entire system is started up and there is no fixed spectrum in use all the channels in the long-term and short-term list will occupy the same position in all cells. So as new calls come into the system they take any arbitrary channels (say according to channel sequence number or as specified by operator) with a check made at the MTSO to avoid instantaneous collision in channel assignment. These initial channel assignments will reflect in the long-term measurements in the system. The long-term ordering in each cell 18 will start this way and evolve with time adapting to system characteristics.

In the case of cells 18 that use ATCs (auto-tune combiners) an algorithm for initial channel selections (until the long-term list evolves to produce the short-term list of preferred channels for the cell under consideration) is as follows:

(1) Start IBDCA
(2) first_channel=[(CS number*#sectors/cell)+sector+1] modulus #channels/application+1
(3) old_channel=first_channel
(where
   if omni cell, sector=0,
   if alpha sector, sector=0,
   if beta sector, sector=1,
   if gamma sector, sector=2,
adjustments made for reserved control channels)
(4) next_channel=[old_channel+Y+X]modulus #channels/application
(where X is an integer margin to allow flexibility to skip channels and Y is an integer channel separation requirement)
(Notes: Need some local adjustment to skip fixed channel assignments, such as DCCH, Analog Control Channels, any other reserved channels)
(5) old_channel=next_channel
(6) For all subsequent channel assignments repeat steps (4) and (5) described above.

In the case of system growth (i.e. addition of new cells) it may take a certain period of time before the long-term ordering adapts to the system characteristics and stabilizes. However the above algorithm can be used for startup in the case of cells 18 that use ATCs.

Hand-off process interacts closely with the IBDCA scheme. Hand-off channels may have to be reserved in the dynamic channel environment. When selecting a channel at the new base station for hand-off the IBDCA scheme for channel assignment is used.

Discussion

The standard for digital control channel IS136A is incorporated herein by reference. The present invention interference based dynamic channel assignment is equally well suited for an indoor wireless communication network, including a PCS network, the SWAN (Seamless Wireless ATM Networking) mobile networked computing environment at Bell Laboratories, or other similar networks.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a wireless communication network, a method for dynamic channel assignment of a plurality of channels, the method comprising the steps of:

prioritizing a channel list distributed on a per cell and/or sector basis so that prioritization is independent of frequency usage information from other cells and/or sectors, wherein the step of prioritizing said channel list the priority is assigned as a function of long term interference variations;

prioritizing a selected subset of said prioritized channel list; and dynamically assigning said plurality of channels from said selected subset.

2. The method as recited in claim 1 wherein the step of prioritizing a channel list is frequency-channel based.

3. The method as recited in claim 1 wherein the step of prioritizing a selected subset of said prioritized channel list is frequency-channel based.

4. The method as recited in claim 1 wherein said function of long term interference variations is a moving average.

5. The method as recited in claim 4 wherein said moving average is a moving average of received signal strength.

6. The method as recited in claim 5 wherein said received signal strength is selected from a sample above a predetermined threshold.

7. The method as recited in claim 5 wherein said received signal strength is weighted.

8. The method as recited in claim 7 wherein said weight is adjusted so that moving averages decrease when interference is low and increase when interference is high.

9. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list; wherein the step of prioritizing said selected subset of said prioritized channel list is assigned as a function of short term interference variations; and
dynamically assigning said plurality of channels from said selected subset.

10. The method as recited in claim 9 wherein said function of short term interference variations is a function of near instantaneous interference measurements.

11. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the step of prioritizing said channel list is time-slot-channel based; and
dynamically assigning said plurality of channels from said selected subset.

12. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the step of prioritizing said selected subset of said prioritizing channel list is time-slot-channel based; and
dynamically assigning said plurality of channels from said selected subset.

13. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the priority of said selected subset is updated more frequently than the priority of said channel list; and
dynamically assigning said plurality of channels from said selected subset.

14. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein said step of prioritizing said selected subset of said prioritized channel list is performed more frequently than said step of prioritizing said channel list; and
dynamically assigning said plurality of channels from said selected subset.

15. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the step of prioritizing said channel list the priority is assigned as a function of uplink characteristics; and
dynamically assigning said plurality of channels from said selected subset.

16. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the step of prioritizing said selected subset of said prioritized channel list the priority is assigned as a function of uplink characteristics; and
dynamically assigning said plurality of channels from said selected subset.

17. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the step of prioritizing said channel list the priority is assigned as a function of downlink characteristics; and
dynamically assigning said plurality of channels from said selected subset.

18. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list, wherein the step of prioritizing said selected subset of said prioritized channel list the priority is assigned as a function of downlink characteristics; and dynamically assigning said plurality of channels from said selected subset.

19. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list; and
dynamically assigning a call when an available channel has a CIR greater than a predetermined minimum.

20. In a wireless communication network, a method for dynamic channel assignment of a plurality of channels, the method comprising the steps of:
prioritizing a channel list distributed on a per cell and/or sector basis so that prioritization is independent of frequency usage information from other cells and/or sectors;
prioritizing a selected subset of said prioritized channel list; and
dynamically assigning a channel from said selected subset of said prioritized channel list with best CIR.

21. In a wireless communication network, a method for dynamic channel assignment of a plurality of channels, the method comprising the steps of:
prioritizing said channel list distributed on a per cell and/or sector basis so that prioritization is independent of frequency usage information from other cells and/or sectors;
prioritizing a selected subset of said prioritized channel list; and
dynamically assigning a channel from said selected subset of said prioritized channel list that has at least a minimum CIR threshold.

22. In a wireless communication network, a method for dynamic channel assignment of a plurality of channels, the method comprising the steps of:
prioritizing a channel list of uplink channels and downlink channels distributed on a per cell/sector basis so that prioritization is independent of frequency usage information from other cells/sectors, wherein the step of prioritizing said channel list the priority is assigned as a function of long term interference variations;
prioritizing a selected subset of said prioritized channel list; and
dynamically assigning said plurality of channels from said selected subset.

23. The method as recited in claim 22 wherein the step of prioritizing a selected subset of said prioritized channel list the priority is assigned as a function of short term interference variations.

24. The method as recited in claim 23 wherein said function of short term interference variations is a function of near instantaneous interference measurements.

25. The method as recited in claim 22 wherein the step of prioritizing a channel list is frequency-channel based.

26. The method as recited in claim 22 wherein the step of prioritizing a channel list is time-slot-channel based.

27. The method as recited in claim 22 wherein the step of prioritizing a selected subset of said prioritized channel list is frequency-channel based.

28. The method as recited in claim 22 wherein the step of prioritizing a selected subset of said prioritizing channel list is time-slot-channel based.

29. The method as recited in claim 22 wherein said function of long term interference variations is a moving average.

30. The method as recited in claim 29 wherein said moving average is a moving average of received signal strength.

31. The method as recited in claim 30 wherein said received signal strength is selected from a sample above a predetermined threshold.

32. The method as recited in claim 30 wherein said received signal strength is weighted.

33. The method as recited in claim 32 wherein said weight is adjusted so that moving averages decrease when interference is low and increase when interference is high.

34. The method as recited in claim 22 wherein the priority of said selected subset is updated more frequently than the priority of said channel list.

35. The method as recited in claim 22 wherein said step of prioritizing a selected subset of said prioritized channel list is performed more frequently than said step of prioritizing a channel list.

36. The method as recited in claim 22 wherein the step of prioritizing a channel list the priority is assigned as a function of uplink characteristics.

37. The method as recited in claim 22 wherein the step of prioritizing a selected subset of said prioritized channel list the priority is assigned as a function of uplink characteristics.

38. The method as recited in claim 22 wherein the step of prioritizing a channel list the priority is assigned as a function of downlink characteristics.

39. The method as recited in claim 22 wherein the step of prioritizing a selected subset of said prioritized channel list the priority is assigned as a function of downlink characteristics.

40. The method as recited in claim 22 further comprising the step of:
admitting a call when an available channel has a CIR greater than a predetermined minimum.

41. The method as recited in claim 22 further comprising the step of:
assigning a channel from said selected subset of said prioritized channel list with best CIR.

42. The method as recited in claim 22 further comprising the step of:
assigning a channel from said selected subset of said prioritized channel list that has at least a minimum CIR threshold.

* * * * *